United States Patent
Basso et al.

(10) Patent No.: US 7,873,027 B2
(45) Date of Patent: *Jan. 18, 2011

(54) DATABASE MANAGEMENT SYSTEM AND METHOD OF USING IT TO TRANSMIT PACKETS

(75) Inventors: Claude Basso, Raleigh, NC (US); Natarajan Vaidhyanathan, Greensboro, NC (US); Colin Beaton Verrilli, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 573 days.

This patent is subject to a terminal disclaimer.

(21) Appl. No.: 11/776,487

(22) Filed: Jul. 11, 2007

(65) Prior Publication Data

US 2008/0016243 A1    Jan. 17, 2008

Related U.S. Application Data

(63) Continuation of application No. 10/219,643, filed on Aug. 15, 2002, now Pat. No. 7,362,744.

(51) Int. Cl.
*H04L 12/28* (2006.01)

(52) U.S. Cl. .................. 370/351; 370/395.31
(58) Field of Classification Search ............... None
See application file for complete search history.

(56) References Cited

U.S. PATENT DOCUMENTS

| | | | | |
|---|---|---|---|---|
| 6,512,744 B1 * | 1/2003 | Hughes et al. | ............... | 370/232 |
| 6,526,055 B1 * | 2/2003 | Perlman et al. | ............... | 370/392 |
| 6,553,002 B1 * | 4/2003 | Bremer et al. | ............... | 370/254 |
| 6,570,866 B1 * | 5/2003 | Murase et al. | ............... | 370/351 |
| 6,604,147 B1 * | 8/2003 | Woo | ............... | 709/240 |
| 7,069,372 B1 * | 6/2006 | Leung et al. | ............... | 710/306 |
| 7,362,744 B2 * | 4/2008 | Basso et al. | ............... | 370/351 |
| 2002/0176355 A1 * | 11/2002 | Mimms et al. | ............... | 370/216 |

* cited by examiner

*Primary Examiner*—Phirin Sam
(74) *Attorney, Agent, or Firm*—Jennifer Davis; Schubert Law Group PLLC

(57) ABSTRACT

A forwarding table, in a network device such as a router, used to forward packets in a communications network includes indicia whose state determine whether information contained in the forwarding table or information contained in the header portion of a packet is to be used to forward the packet to the next hop (i.e. next point in the route).

20 Claims, 6 Drawing Sheets

| Subnet | Flag | Next Hop IP address | Outgoing Interface |
|---|---|---|---|
| 11.x.x.x | Reset | 11.0.0.1 | I2 |
| 10.x.x.x | Reset | 9.0.0.1 | I1 |
| 9.x.x.x | Set | Contents does not matter | I1 |

FIG. 1
(Prior Art)

| Subnet | Net Hop IP address | Outgoing Interface |
|---|---|---|
| 11.x.x.x | 11.0.0.1 | I2 |
| 10.x.x.x | 9.0.0.1 | I1 |
| 9.0.0.2 | 9.0.0.2 | I1 |
| 9.0.0.3 | 9.0.0.3 | I1 |
| . | . | . |
| . | . | . |
| . | . | . |
| 9.0.0.100 | 9.0.0.100 | I1 |

FIG. 3

| Subnet | Flag | Next Hop IP address | Outgoing Interface |
|---|---|---|---|
| 11.x.x.x | Reset | 11.0.0.1 | I2 |
| 10.x.x.x | Reset | 9.0.0.1 | I1 |
| 9.x.x.x | Set | Contents does not matter | I1 |

ROUTER 40

DATABASE MANAGEMENT SYSTEM AND METHOD OF USING IT TO TRANSMIT PACKETS

Pursuant to 35 USC §120, this continuation application claims priority to and benefit of U.S. Utility patent application Ser. No. 10/219,643, filed Aug. 15, 2002, now U.S. Pat. No. 7,362,744 on behalf of inventors Claude Basso, Natarajan Vaidhyanathan, Colin Beaton Verrilli, entitled "Database management system and method of using it to transmit packets."

FIELD

The present invention relates to database management in general and in particular to databases used to route packets in communications networks.

BACKGROUND

In a data communications network a forwarding device such as a router or the like is used to direct data packets from a source device to a destination device. In order to effectuate the forwarding of packets a database hereinafter termed "Forwarding Table" is generated and maintained in the router. FIG. 1 shows a graphical representation of the prior art forwarding table implemented in a router such as Router 40 FIG. 2 consisting of Destination, Subnet Subfield, Next Hop IP address subfield and Outgoing Interface subfield.

The forwarding entries in FIG. 1 are derived from the network configuration shown in FIG. 2 which will be described in greater details hereinafter. Suffice it to say at this point the destination addresses of devices attached to the router are recorded in the Destination Subnet subfield; the next hop IP address to which a packet is to be routed in order to be delivered to a particular destination address is recorded in the Next Hop IP Address subfield and the exit port or interface through which the packet exit is recorded in the outgoing interface subfield of FIG. 1. The coding in FIG. 1 is decimal with 'XXX' indicating Don't Care state.

With the above nomenclature each entry in FIG. 1 includes the destination subnet, the next Hop IP address and the outgoing port or interface. With respect to the first entry in the Prior Art Routing Table of FIG. 1 only the first byte "11" of the destination subnet entry is of value or interest. The other bytes 'XXX' are Don't Care and of no interest. The entry in the Next Hop IP address indicate that only one device with the IP address "11.0.0.1" is coupled to subnet 11.X.X.X and the outgoing interface is I2. Similarly, the second entry in the table indicates only one device with Next IP Address 9.0.0.1 is coupled to Destination Subnet 10.X.X.X and the outgoing interface is I1.

The other listings in the prior art forwarding table of FIG. 1 shows the destination subnet and corresponding Next Hop IP Address are identical and identify each end stations connected to Destination subnet 9.X.X.X. It is also obvious that the size of the table could be extremely large as the number of end stations increases. The showing in the routing table of FIG. 1 indicates 100 end stations labeled 9.0.0.2 through 9.0.0.100 connected to Subnet 9.X.X.X which is directly attached to Interface or Port I1 of Router 40. But in reality and as more users are connected to the internet and other types of networks it would not be unreasonable to have single or multiple directly connected subnets attaching tens of thousands of end stations to a router. Because each end station has to be recorded the size of the forwarding table would be unacceptable.

The prior art requirement to record all directly connected end stations in the forwarding table creates several problems. One of the problems is that a large amount of storage is required to record large number of end stations. The storage has to be relatively fast in order to meet performance requirements of most systems. The type of storage required for use in this application tends to be expensive and as a result increases the overall price of the forwarding device.

Another problem associated with a large forwarding table is that it tends to impair the throughput or performance of the forwarding device. As is well known the forwarding table contains information that is used to route packets. To accomplish this task the forwarding device includes routing functions that routinely scan the table to detect entries with destination addresses matching destination addresses in the packet being routed. This searching has to be done in a finite time interval which is sensitive, among other things, to the table size and memory speed. In fact, as the size of the forwarding table increases the time interval required to complete a search increases until the finite time is surpassed. Arguably, high performance specialized processors could be used as the search engine. But use of this type of processors is costly and would increase the overall cost of the forwarding device.

Another factor contributing to performance degradation is maintenance of the forwarding table to reflect the insertion and de-insertion of nodes into/from the network. This requires deleting from the forwarding table entries for de-inserted nodes and adding entries for newly inserted nodes. More time and resources are required to maintain a large forwarding table than would be required to maintain an optimum size forwarding table.

In view of the above there is a need to provide optimized forwarding tables for use to forward packets within communications networks.

SUMMARY

The above problems are solved by using a single entry and indicium in the forwarding table to represent routing information for multiple end stations connected to the network. In particular, the forwarding table according to the present invention is optimized by aggregating end stations connected to subnets that are directly attached to a router and making a single entry with a flag bit for the aggregated end stations in the network forwarding table. If the flag bit is not set the "Next Hop" for routing packets is the Next Hop IP Address in the table. If the flag bit is set the "Next Hop" for routing the packet is the IP DA in the packet. By aggregating multiple end stations entry into a single entry with a flag bit the size of the table is significantly smaller than the one promulgated by the prior art. As a result of the smaller forwarding table the following advantages are derived: table lookups are faster, less memory is required and inserts/deletes into the table are faster.

These and other advantages of the present invention will become apparent from the following illustration and detailed description. The invention may be modified in various obvious respects, all without departing from the teachings of the invention and is deemed to fall within the scope of the appended claims.

BRIEF DESCRIPTION OF THE DRAWINGS

FIG. 1 illustrates the prior art forwarding table generated from the communications network shown in FIG. 2.

FIG. 3 shows a Forwarding Table according to the teachings of the present invention and is generated from the communications network of FIG. 2.

DETAILED DESCRIPTION OF EMBODIMENTS

Figure 2:
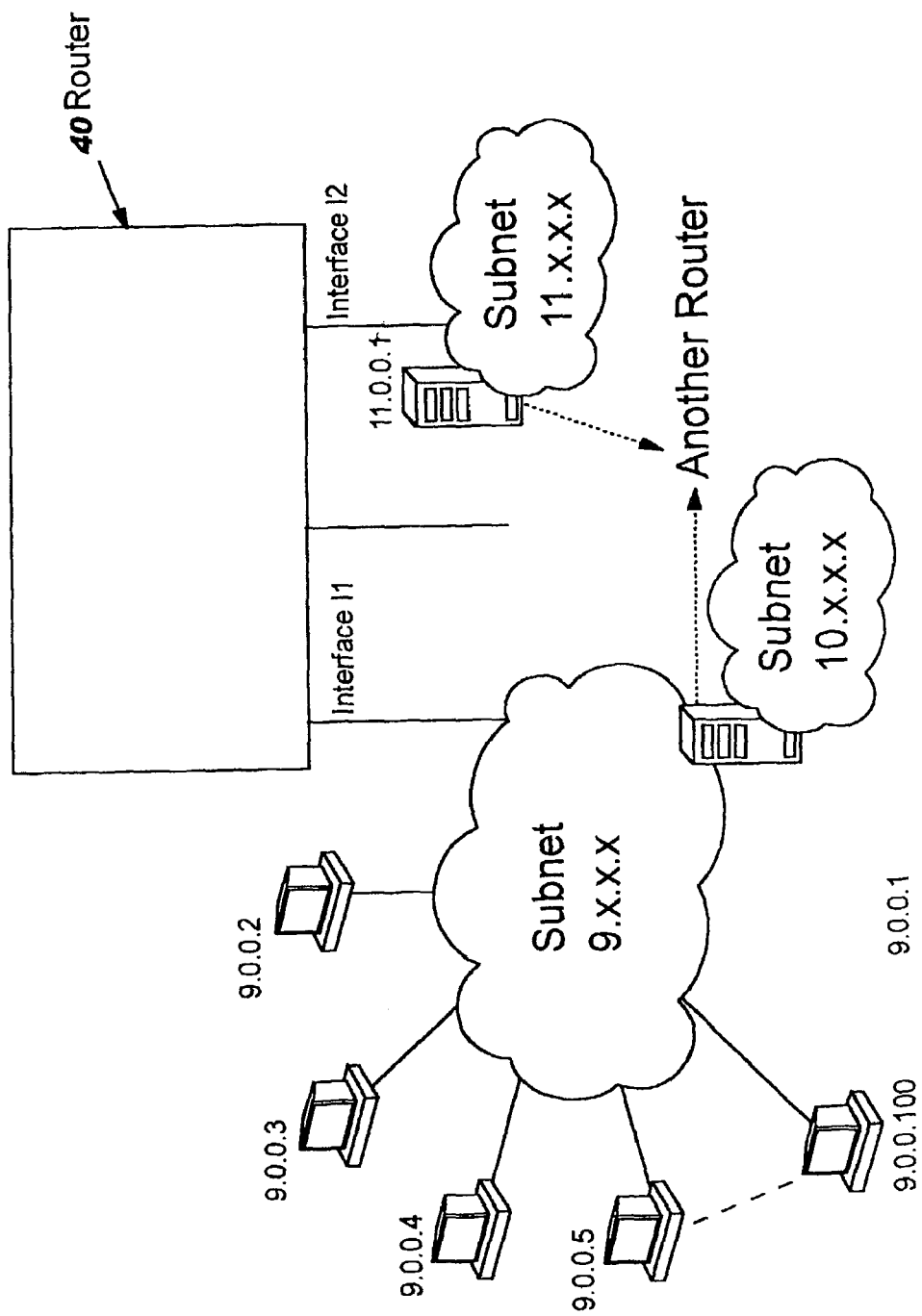
FIG. 2 shows a communications network.

FIG. 2 illustrates a network having router 40 or other network device interconnected through interface I1 and interface I2 to subnet 9.X.X.X and router 11.0.0.1, respectively. Even though the network shows only 3 interfaces, two of which are labeled, this should not be construed as a limitation of the scope of the invention. Since in an actual embodiment several other interfaces and connected networks would be shown. As a consequence the showing should be construed as illustrative rather than a limitation on the scope of the invention. As is used in this document interface and port are used interchangeably, referring to a point whereat information is received and transmitted from the router. The subnet 9.X.X.X is operatively connected to end stations labeled 9.0.0.2 through 9.0.0.100 and router 9.0.0.1. The router 9.0.0.1 is connected to subnet 10.X.X.X. The interface I2 is connected to router 11.0.0.1 which is connected to subnet 11.X.X.X. It should be noted that the X.X.X associated with each of the subnets represent Don't Care states whereas the decimal character in the first byte of the address identifies the destination address of the subnet. It should also be noted that each of the subnets are made up of a plurality of different type communications networks including the Internet, Wide Area Network, Local Area Network, etc. In addition, the transmission media in each of these subnets could be wireless, wired or optical medium. The cloud representation of each of the subnets is intended to represent the diverse characteristics of each of the subnets. It should also be noted that subnet 9.X.X.X is regarded as a direct connected subnet to router 40 whereas subnets 10.X.X.X and 11.X.X.X are considered remote subnets.

In order to route or forward information from one interface of the router to another a forwarding table has to be generated in the router. FIG. 1 shows a prior art routing table for the network shown in FIG. 2. The routing table in FIG. 1 is generated using prior art method which has been described under the prior art section of this application and will not be repeated here. Suffice it to say that in FIG. 1 each of the end stations that are connected to subnet 9.X.X.X are individually recorded in the forwarding table of FIG. 1. As argued above, this makes an unnecessarily large forwarding table which the present invention corrects by a scheme which makes the routing table much smaller than the one shown in FIG. 1.

FIG. 3 shows a forwarding table generated according to the teachings of the present invention. The forwarding table in FIG. 3 is generated based upon the network shown in FIG. 2. A cursory glance between FIG. 3 and FIG. 1 clearly shows that the forwarding table in FIG. 3 is much smaller than the one shown in FIG. 1 even though both routing tables contain the same amount of information that allows the forwarding of data within the network shown in FIG. 2. As a consequence casual observation clearly shows that the routing table in FIG. 3 has solved the problem which the routing table in FIG. 1 presents.

Still referring to FIG. 3, the forwarding table includes a Destination Subnet Address field, Flag field, Next Hop IP Address field and Outgoing Interface or port field. Each entry in the forwarding table records the route that a packet must traverse in order to go from a port at which the packet was received (source port) to the next hop to which the packet must be forwarded in order to reach its destination. The flag field carries a bit which can be set in one of two states. When it is in a reset state the next hop is the address in the table. When the flag is in a set state the next hop address is the destination address in the packet itself. As a consequence, when the flag is set the contents of the Next Hop IP Address field is ignored. The forwarding table in FIG. 3 is configured based upon the network shown in FIG. 2. To this end the first entry in the table has destination subnet address 11.X.X.X with the flag set in the reset state, the next hop IP address being 11.0.0.1 and outgoing interface being I2. Likewise, the second entry in the table covers subnet 10.X.X.X with the flag in a reset state, the next hop being 9.0.0.1 and outgoing interface I1. Of importance is the recordation in the table for the end stations 9.0.0.2 through 9.0.0.100 connected to subnet 9.X.X.X. Whereas in the prior art table, shown in FIG. 1, each of the end stations are identified in the routing table in FIG. 3 the end stations are aggregated and the single entry is entered is made. The single entry includes 9.X.X.X, I1, and the flag is set which indicates that the next hop IP address is the Destination Address in the packet. The contents of the Next Hop IP address is of no moment or importance because the information for routing is in the packet itself and not in the forwarding table.

Turning to Table 1 for the moment, an IP header layout or format for IPV4 packets is shown.

TABLE 1

| Field | Length (bits) | Explanation |
|---|---|---|
| Version | 4 | |
| IHL | 4 | Length of header expressed as a number of 32-bit words. |
| TOS | 8 | |
| TL | 16 | Total Length of the complete datagram (including the header) expressed as a number of octets. |
| ID | 16 | All the fragments of a datagram from the same source will have the same value in this field. |
| Reserved Flag | 1 | Unused. Typically set to 0. |
| DF | 1 | Don't Fragment Flag. If set and if the datagram needs fragmentation, the datagram should be dropped and ICMP error message should be generated. |
| MF | 1 | More Fragments Flag. Used by the destination to identify the last fragment during reassembly. |
| FO | 13 | Fragment Offset: Indicates the relative position of the fragment within the original unfragmented packet. |
| TTL | 8 | Time to Live |
| Protocol | 8 | Identification of higher layer payload type |
| Protocol | 8 | Identification of higher layer payload type |
| CK | 16 | Checksum of header |
| SA, DA | 64 | Source and Destination IP addresses |
| Options | Variable | 0 through 40 octets for source-routing record route, security etc. |
| padding | Variable | Octets to make the length of the header (in octets) a multiple of 4 |

The first column represents the field and abbreviation for each field, the second column indicates the number of bits in each field and the third column gives an explanation. The table is self-explanatory and will not be described further. Suffice it to say that the only field that is of interest to the present invention is the destination address (DA) field. As will be explained subsequently, when the search engine receives a packet with a header such as the one shown in Table 1 the search engine parses the header to determine the destination address. The search engine then searches the forwarding table and on detecting an address in the Destination Subnet Address field matching the Destination Address in the received packet the search engine examines the flag field and if the associated bit in the flag field is in its reset state (i.e. logical 0) the search engine uses the next hop address in the forwarding table to forward the packet. If the flag bit is set to a '1' the contents in the Next Hop IP address field is ignored and the DA address in the packet is used to route the packet.

Figure 4:
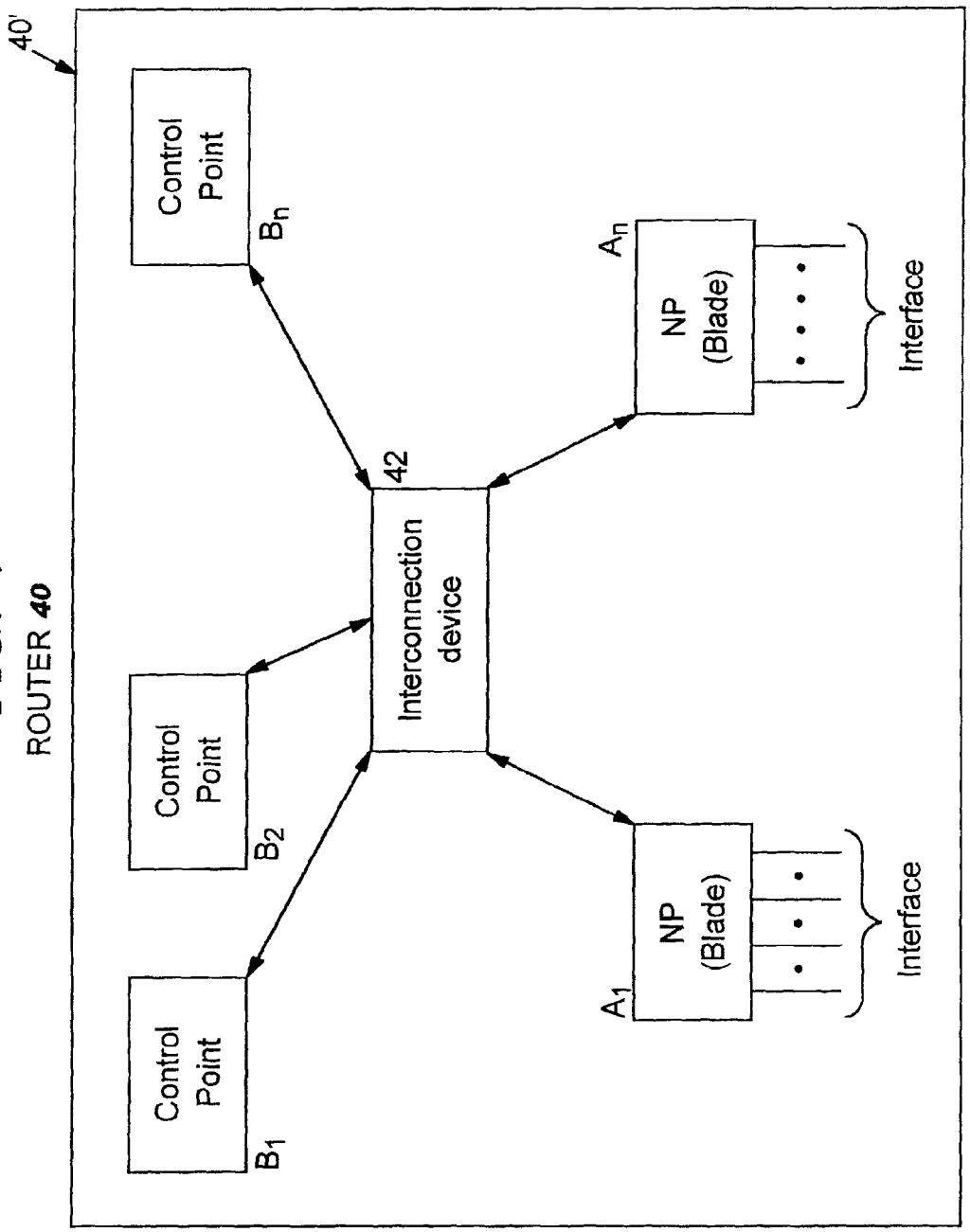
FIG. 4 shows a block diagram for the router 40 shown in FIG. 2.

FIG. 4 shows a block diagram for the router shown in FIG. 2. The router includes housing 40' in which a plurality of blades labeled A1-An are connected by interconnection device 42 to a plurality of control points labeled B1 through BN. Each blade is provided with a plurality of independent interfaces to be used to connect external networks, such as is shown in FIG. 2, or devices. Interconnection device 42 could be an appropriate interconnecting bus or a switch or a combination of switch and bus. Selection of an appropriate interconnection device is well within the skill of one skilled in the art and further description of the interconnection device is not warranted. The control point could include general purpose computers having input/output terminals that can be used for an operator to interact with the computers. The number of control point processors and/or blades is dependent on the type of router that the designer wishes to develop.

Still referring to FIG. 4, the major function of the blade is to provide routing for packets. When a blade receives a packet, if it knows where to send the packet, the packet is forwarded without communicating with the control point. If the blade does not have enough information to route the packet the packet is forwarded to the control point for further action. The blade can be designed from scratch with discrete logic components or an off-the-shelf device termed "Network Processor" can be used. In one embodiment of the router NP4GS3 is used for each one of the blades. NP4GS3 is a family of Network Processors developed, manufactured and marketed by International Business Machines Corporation. It should be noted that other Network Processors provided by other manufacturers can be used without departing from teachings of the present invention.

Figure 5:
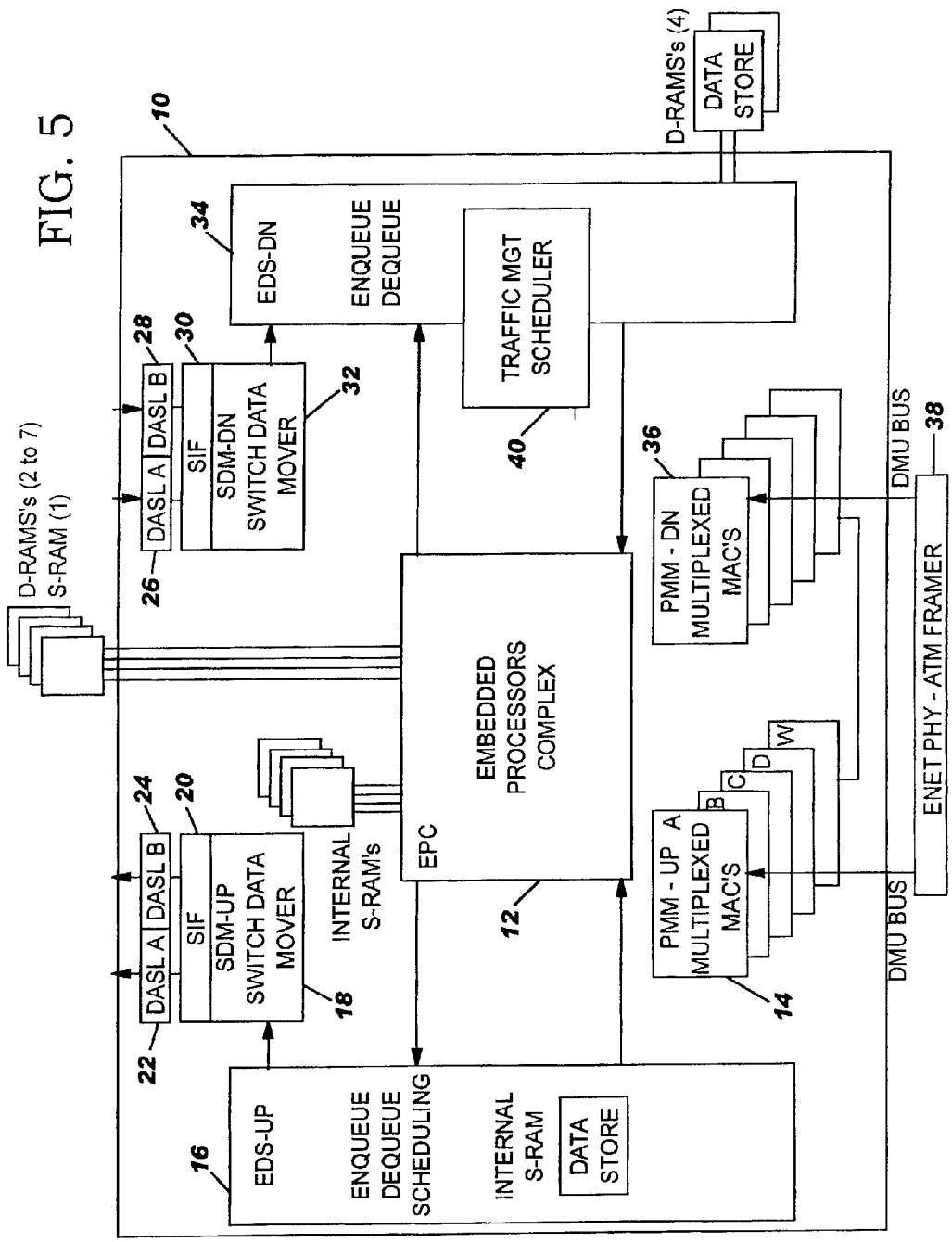
FIG. 5 shows a block diagram of a Network Processor (NP) that can be used for blades shown in FIG. 5.

FIG. 5 shows a block diagram of the NP4GS3 sometimes called interface device chip that includes substrate 10 and a plurality of sub-assemblies integrated on the substrate. The sub-assemblies are arranged into an Upside configuration and a Downside configuration. As used herein, "Upside" refers to data flows inbound from a network to the apparatus here disclosed, while "Downside" refers to data outbound from the apparatus to a network serviced by the apparatus. The data flow follows the respective configurations. As a consequence, there is an Upside data flow and a Downside data flow. The sub-assemblies in the Upside include Enqueue-Dequeue-Scheduling UP (EDS-UP) logic 16, multiplexed MAC's-UP (PPM-UP) 14, Switch Data Mover-UP (SDM-UP) 18, System Interface (SIF) 20, Data Align Serial Link A (DASLA) 22, and Data Align Serial Link B (DASLB) 24. A data align serial link is more fully described in U.S. Pat. No. 6,222,380 filed Jun. 11, 1999 and entitled "High Speed Parallel/Serial Link for Data Communication" mentioned herein above and incorporated by reference hereinto. While the preferred form of the apparatus of this invention here disclosed uses a DASL link, the present invention contemplates that other forms of links may be employed to achieve relatively high data flow rates, particularly where the data flows are restricted to being within the VLSI structure.

The sub-assemblies in the downside include DASL-A 26, DASL-B 28, SIF 30, SDM-DN 32, EDS-DN 34, and PMM-DN 36. The chip also includes a plurality of internal S-RAM's, Traffic Mgt Scheduler 40, and Embedded Processor Complex (EPC) 12. An interface device 38 is coupled by respective DMU Busses to PMM 14 and 36. The interface 38 could be any suitable L1 circuitry, such as ethernet Physical (ENET PHY), ATM Framer, etc. The type of interface is dictated in part by the network media to which the chip is connected. A plurality of external D-RAM's and S-RAM are available for use by the chip.

A more detailed description of the Network Processor is set forth in U.S. Pat. No. 6,404,752 issued Jun. 11, 2002 and incorporated herein by reference. As is set forth in the subject patent, the routing of packets is effectuated by the embedded processor complex 12 designed to efficiently execute a specifically designed instruction set for packet processing and forwarding. The processors receive support from specialized coprocessor (e.g. for table look-up or checksum computation) to achieve highly sophisticated packet processing at line speed. But not only the instructions set is customized for packet processing and forwarding. The entire design of the Network Processor, including execution environment, memory, hardware exhilarators, and bus architecture, are dedicated to high performance packet handling.

Referring again to FIG. 4, the control point processors are general purpose processors that provide management function for the router. The forwarding tables are generated in the control point processor and downloaded into the network processors. The methods used in the control processor to generate the forwarding table are well known and will not be described in detail. Suffice it to say that one way in which the forwarding tables are generated requires a programmer to use the I/O devices (not shown) associated with each of the control point processors to enter the network configuration of all the subnets and terminals directly connected to the router. To gain information about remote subnets and connected devices the control processor executes a routing protocol such as OSPF. As a result of the protocol execution control frames are exchanged between the router and others in the network to exchange network configuration information. The acquired network information is loaded into the forwarding table structured according to teachings of the present invention is then downloaded into the Network Processor. Once loaded in the Network Processor the information in the forwarding table is used to forward data in a way described herein.

Figure 6:
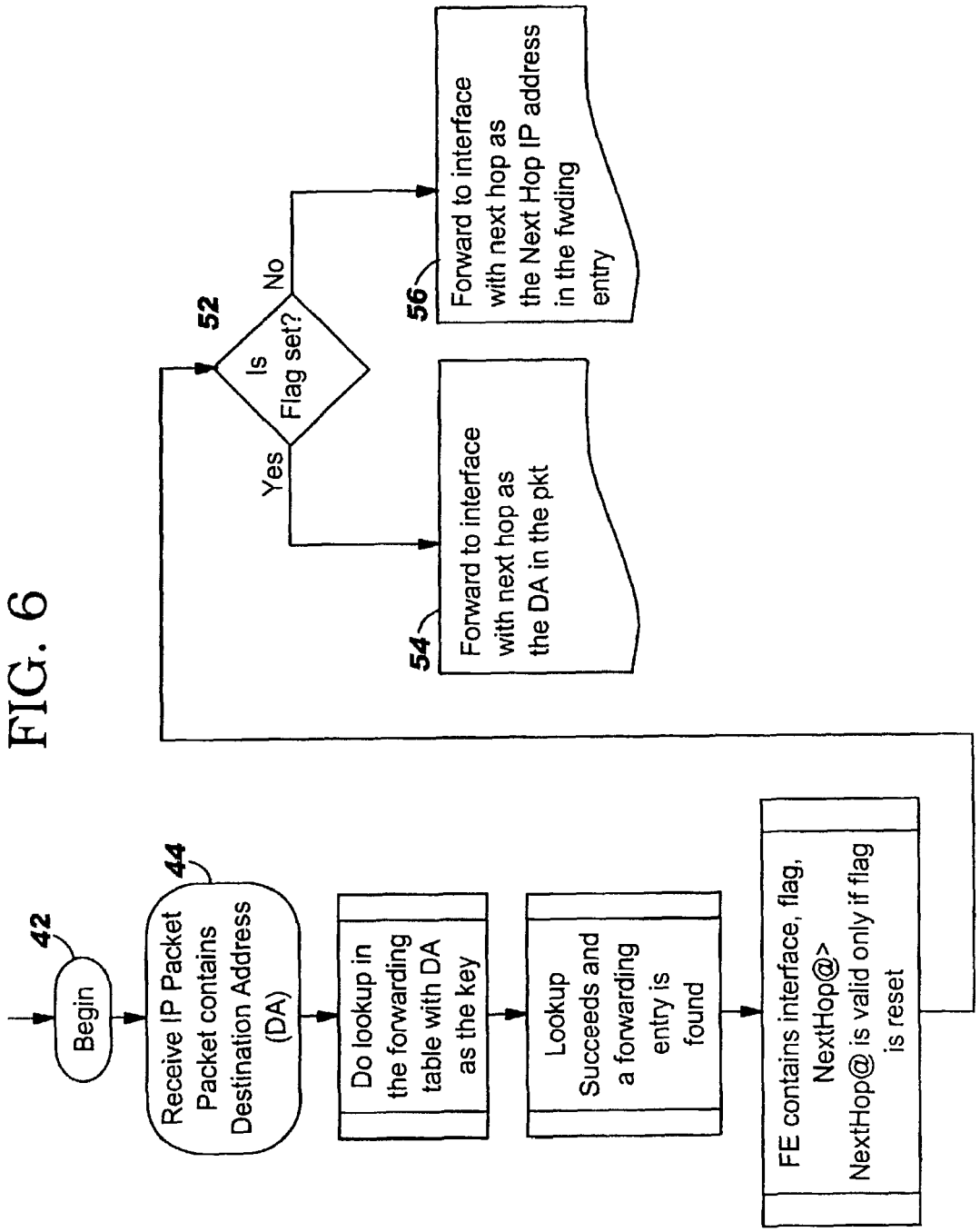
FIG. 6 shows a flowchart for a program used by a processor of the NP to correlate addresses in a packet with entries in the forwarding table according to teachings of the present invention.

FIG. 6 shows a flowchart of a program which is executed on the processor or coprocessor used to search the forwarding table. The program begins in block 42 descends into block 44 whereat an IP packet with a header such as the one shown in Table 1 containing a Destination Address (DA) is received. The program then descends into block 46 where a lookup in the forwarding table using the DA address as the key is done. The program then descends into block 48. If the lookup is successful the entry (block 50) contains a flag Next Hop IP Address and outgoing interface number. The program then descends to block 52 where it tests the flag to determine its state. If the flag is set the program exits block 52 along the Yes path into block 54 where the packet is forwarded with the next hop address being the DA in the packet. If in block 52 the flag was not set (reset) the program exits along the No path into block 56 where the frame is forwarded using the Next Hop IP address in the forwarding entry as the next hop. In essence, as to whether the next hop DA is used from the forwarding entry or from the packet depends on the state in which the flag bit is in. If the flag bit is set (i.e. logical "1") the DA for the next hop is in the packet itself. If the flag is reset (i.e. logical "0") the DA for the next hop is taken from the forwarding entry in the forwarding table.

The invention has been described above with reference to specific embodiments. However, this is only illustrative. Numerous other embodiments may be devised by one having ordinary skill in the art without departing from the spirit and scope of the following claims.

What is claimed is:

1. A method to route packets in a communications network including the acts of:
providing, in a router, a forwarding table including at least a destination address subnet field populated with pre-defined addresses, a Next Hop Address Field, an Outgoing Interface field populated with outgoing port identification numbers, and a flag field populated with at least one indicium set to one of two states, wherein the indicium is set to a first state for aggregation of multiple end stations to a single entry of the indicium;
receiving a packet in said router;
parsing the packet with a microprocessor to determine the destination address in the packet;
searching the table with the microprocessor to detect any entry with a predefined address matching the destination address in the packet;
if a match is found, examining the indicium; and
forwarding the packet based upon information in the forwarding table if the indicium is in a second state.

2. The method of claim 1 further including the act of forwarding the packet based upon information in the packet if the indicium is in the first state.

3. The method in claim 1 further including the act of forwarding the packet based upon information in the packet and information in the table if the indicium is set to the first state.

4. The method of claim 1 wherein the first state is a "set" of the indicium.

5. The method of claim 2 wherein the second state is a "reset" of the indicium.

6. The method of claim 2 wherein the information includes destination address.

7. A method to forward packets in a communications network including acts of:
receiving a packet in a router;
determining a destination address carried in said packet;
searching a forwarding table to identify an entry with a destination address matching the destination address in the packet;
examining an indicium of a flag field of the forwarding table associated with the matched entry, wherein the indicium is set based upon aggregation of multiple end stations for the matched entry; and
forwarding the packet based upon information contained in the forwarding table if the indicia is in a first state.

8. The method of claim 7 further including the act of forwarding the packet based upon information in the packet if the indicium is in a second state.

9. A computer program product for an interconnection device of a communications network, the computer program product including:

a tangible medium on which the computer program is recorded, said computer program including:
first code module containing computer code that examines a packet to determine the destination address in said packet;
second code module that scans a forwarding table to detect an entry having a destination address matching the destination address in the packet; and
third code module that causes the interconnection device to forward the packet based upon information in the table if an indicium in a matched entry is in a first state, wherein the indicium is in a second state for aggregation of multiple end stations to the matched entry.

10. The computer program product of claim 9 further including fourth code module that forwards the packet based upon information in the packet if the indicia is in the second state.

11. A device that forwards packets in a communications network including:
a forwarding table including a destination address subnet field populated with predefined addresses, a flag field populated with at least one indicia set to one of two states based upon aggregation of multiple end stations to a single entry of the forwarding table which comprises the indicium, a Next Hop Address Field populated with destination addresses, and Outgoing Interface field populated with outgoing port ids; and
a controller receiving a packet and forwarding said packet based upon information in the packet if the at least one indicia is set to a first state.

12. The method of claim 8, further comprising determining, by the router, that the multiple end stations are associated with a subnet of the communications network.

13. The method of claim 12, further comprising aggregating the multiple end stations to the matched entry of the forwarding table.

14. The method of claim 13, wherein the aggregating the plurality comprises setting the at least one indicia to the second state.

15. The method of claim 14, wherein the forwarding the packet based upon information in the packet comprises ignoring a value of a field of a hop address of the matched entry.

16. The method of claim 7 wherein the examining the indicium comprises determining the state of a single bit.

17. The computer program product of claim 10, further comprising a fifth code module that determines that the multiple end stations are associated with single a subnet.

18. computer program product of claim 17, further comprising a sixth code module that aggregates the multiple end stations to the matched entry of the forwarding table, wherein the aggregation of the multiple end stations comprises setting the indicium to the second state.

19. The device of claim 11, wherein the controller comprises a network processor, wherein the network processor comprises a specifically-designed instruction set for packet processing and forwarding.

20. The device of claim 19, further comprising a control point processor configured to generate the forwarding table and download the forwarding table to the network processor.

* * * * *